350-319
3/9/76

United States Patent [19]

Meginnis

[11] 3,942,881
[45] Mar. 9, 1976

[54] SIGHT GLASS ASSEMBLY

[76] Inventor: Charles E. Meginnis, 529 1/2 Nancy St., Charleston, W. Va. 25302

[22] Filed: Nov. 12, 1974

[21] Appl. No.: 523,277

[52] U.S. Cl. ................................. 350/319; 73/334
[51] Int. Cl.² ........................................ G02B 5/00
[58] Field of Search ...... 350/318, 319; 73/330, 334, 73/326; 220/82 A; 137/559; 116/117 C

[56] References Cited
UNITED STATES PATENTS

| 3,345,872 | 10/1967 | Meginnis | 73/334 |
| 3,438,540 | 4/1969 | Leroy | 73/334 |
| 3,505,807 | 4/1970 | Piquerez | 350/319 |
| 3,625,390 | 12/1971 | Meginnis | 350/319 |
| 3,782,809 | 1/1974 | Shropshire | 350/319 |

Primary Examiner—Archie R. Borchelt
Assistant Examiner—D. C. Nelms
Attorney, Agent, or Firm—Mason, Fenwick & Lawrence

[57] ABSTRACT

A sight glass assembly generally including a housing structure having an opening therethrough, the opening having an enlarged section providing a shoulder, a face plate having an opening registered with the opening in the housing structure, mounted on the housing structure in opposed relation to the shoulder provided by the enlarged section of the housing opening, a lens disposed in the enlarged section of the housing opening and interposed between the shoulder provided by the enlarged section of the housing opening and the face plate, a compressible packing member disposed in the enlarged section of the housing opening between the housing and a periphery of the lens, an outer end of the packing member having an annular recess extending toward the face plate, an annular wedging member disposed on the shoulder provided by the enlarged section of the housing opening and projecting into the recess of the packing member, the wedging member having a cross-sectional area greater than the cross section area of the recess of the packing member in the uncompressed state, and means for securing the face plate to the housing, applying a force on the packing member whereby the packing member is caused to engage the wedging member and expand it laterally to provide a compressive force about the periphery of the lens and effect a seal between the housing structure and the periphery of the lens.

10 Claims, 3 Drawing Figures

SIGHT GLASS ASSEMBLY

The present invention relates to a sight glass assembly, and more particularly to a sight glass assembly suitable for use with a large vessel containing fluid under pressure.

In the prior art, there has been developed a type of sight glass assembly which generally includes a housing structure having an opening therethrough, which is adapted to be mounted across an opening in a pressure vessel, and a lens mounted in the opening of the housing structure. In this particular type of sight glass assembly, it has been found that the principal source of failure has consisted of fractures of the lens resulting in leakage and possibly blowouts. Such cause of sight glass failures greatly has been obviated in prior art sight glass designs wherein a packing member is provided between the wall of the housing opening and the periphery of the lens which packing is placed under compression causing it to expand laterally and correspondingly place the lens in radial compression and form a tight seal between the lens and the housing structure. It has been found to be desirable, however, to provide such a type of assembly which can be more economical to manufacture and highly effective in performance and reliability.

Accordingly, it is the principal object of the present invention to provide an improved sight glass assembly.

Another object of the present invention is to provide an improved sight glass assembly for use on vessels containing fluids under pressure.

A further object of the present invention is to provide an improved sight glass assembly for use in vessels containing corrosive fluids under elevated pressures.

A still further object of the present invention is to provide an improved sight glass assembly of the type utilizing a packing member disposed between a lens and a housing in which such a lens in mounted, which cooperates with other components of the assembly to place the lens under radial compression thus preventing a blowout of the lens upon the lens becoming fractured, and to form a fluid tight seal between the lens and the housing structure thereof.

Another object of the present invention is to provide an improved sight glass assembly utilizing a compressible packing member interposed between the lens and housing thereof, in which packing member is shielded from the possible corrosive effects of the medium contained in the vessel on which the assembly is mounted.

A further object of the present invention is to provide an improved sight glass assembly of the type utilizing a resilient packing member interposed between a lens and a housing member in which the lens is mounted, which cooperates with other components of the assembly to place the lens in radial compression and to form a fluid type seal between the lens and the housing structure, which is simple in design, more economical to manufacture and highly effective in performance and reliability.

Other objects and advantages of the present invention will become more apparent to those persons having ordinary skill in the art to which the present invention pertains, from the following description taken conjunction with the accompanying drawing, wherein.

Figure 1:
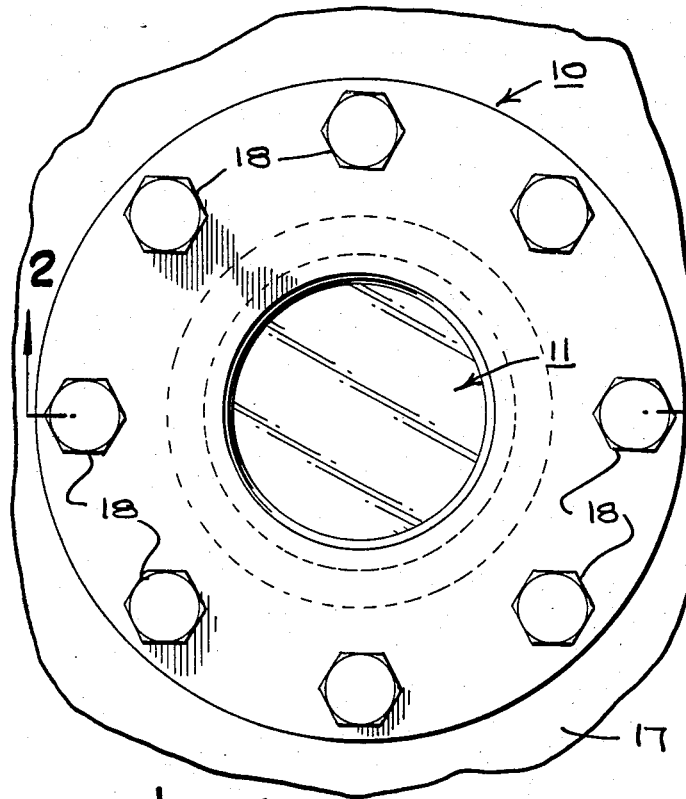
FIG. 1 is a top plan view of an embodiment of the invention.
Figure 3:
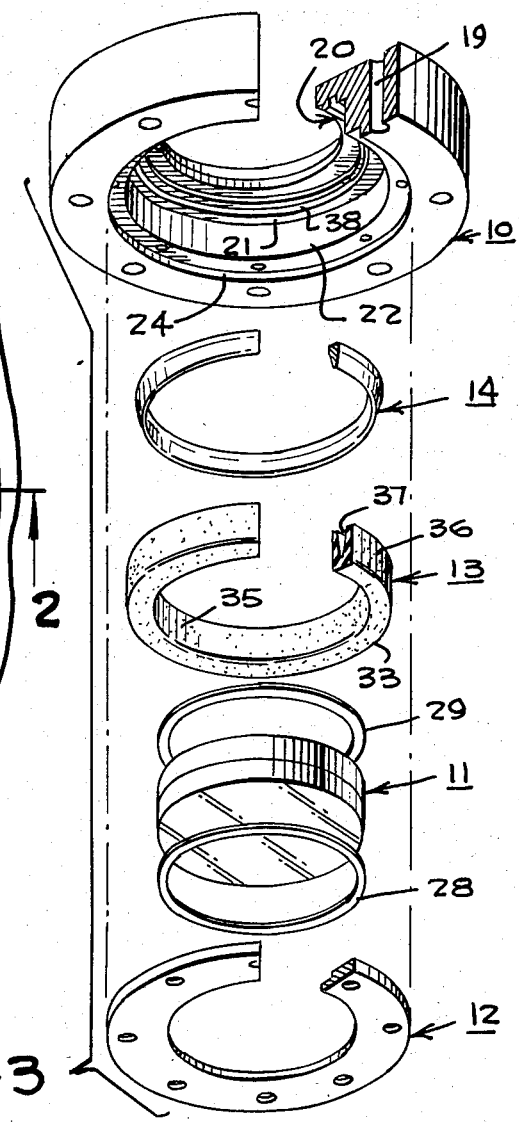
FIG. 3 is an exploded view of the embodiment illustrated in FIGS. 1 and 2.
Figure 2:
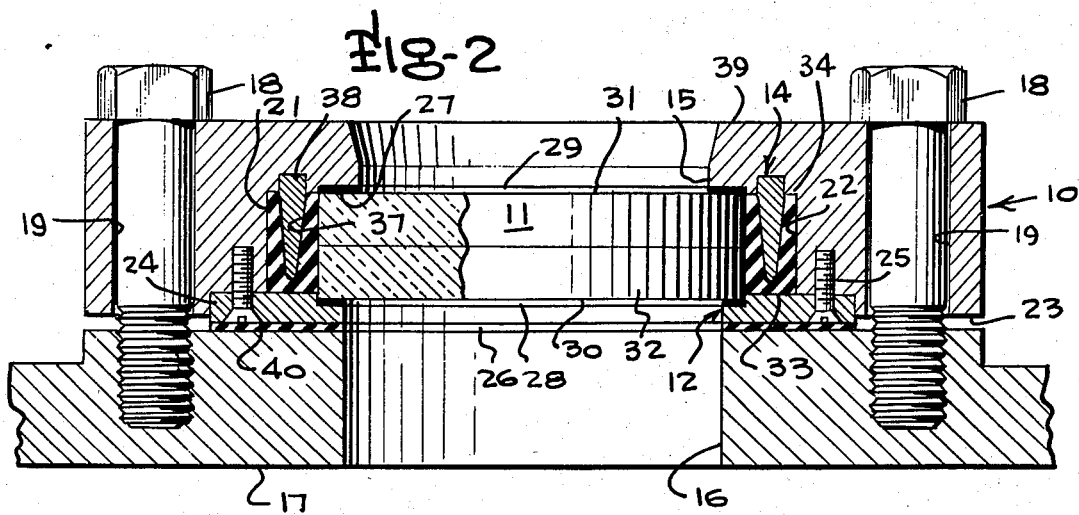
FIG. 2 is an enlarged cross-sectional view taken along line 2—2 in FIG. 1.

The embodiment illustrated in FIGS. 1 through 3 generally includes a housing 10, a lens 11, a face plate 12, a compressible packing member 13 and a wedging member 14. The housing structure generally has an annular configuration, providing an opening 15 adapted to register with an opening 16 in a wall 17 of a vessel containing a fluid possibly corrosive in nature and at an elevated differential in pressure and/or temperature. The housing structure is secured to the fluid vessel by means of a plurality of bolts 18 extending through suitable openings 19 circumferentially spaced in the housing member, which are adapted to register with threaded holes in the wall of the fluid vessel. The opening 15 in the housing structure is provided with an enlarged section 20 which provides an annular shoulder 21 at the outer end thereof and an annular wall 22. Inner end surface 23 of the housing structure is provided with an annular recess 24 in which face plate 12 is seated, as best illustrated in FIG. 2. The face plate is secured to the housing structure by a plurality of screws 25 which extend through circumferentially spaced openings in the face plate and are threaded into registerable threaded holes in the housing structure.

The outer end surface of face plate 12 and the opposed shoulder 21 are provided with annular recesses 26 and 27, respectively, in which there are seated gaskets 28 and 29, respectively. Lens 11 is mounted within the housing structure between gaskets 28 and 29 having the peripheral portion of inner surface 30 seated on gasket 28, the peripheral portion of outer surface 31 seated on gasket 29, and the peripheral side surface 32 thereof being spaced from annular wall 22 to provide an annular space between the lens and the housing structure.

Packing member 13 is disposed in the annular space provided between the periphery and the lens and the housing structure, and has a substantially U-shaped cross-sectional configuration. It is provided with an inner end surface 33 engaging the face plate, an outer end surface 34 engaging shoulder 21, radially inner and outer side surfaces 35 and 36 engaging peripheral surface 32 of the lens and annular wall 22 of the housing structure, and a recess 37 formed in outer end surface 34 and extending the major portion of the length of the packing member, toward face plate 12. The base end of wedging member 14 is seated in an annular recess 38 formed in shoulder 21. The wedging member has a tapered cross-sectional configuration and projects into recess 37 of the packing member the entire length thereof. Moreover, the portion of the wedging member received within recess 37 has a larger cross-sectional area than recess 37 when the packing member is in an uncompressed state so that when the components of the assembly are assemblied, the insertion of the wedging member into recess 37 will cause the packing member to expand, as later will be described.

In the assembly of the embodiment described, the housing structure is first positioned on its outer surface 39, gasket 29 is seated in recess 27 and the base end of wedge member 14 is seated in recess 37. Lens 11 is then inserted in opening 15 and seated on gasket 29, providing an annular recess about the periphery thereof with the wedging member projecting therethrough. Next, packing member 13 is inserted in the annular space about the periphery of the lens so that the wedging member is received within recess 37 of the packing member. After the packing member has been manually pressed into position, gasket 28 is positioned on the periphery of lens surface 30 and the face plate is positioned on end surface 33 of packing member 13 with the openings therein registered with the threaded holes in the housing member. At such stage of assembly, due to the uncompressed condition of packing member 13, the face plate either will be spaced from or not in firm engagement with the housing structure and gasket 28. However, when the face plate is forced against the packing member either by the insertion of screws 25 alone or the use of a press acting on the face plate and the subsequent insertion of screws 25, the face plate will be permanantly seated in recess 24 of the housing structure and a will firmly engage gasket 28. As the face plate is forced against the packing member, the sides of recess 37 will engage the converging sides of the wedging member and cause the packing member to expand laterally thus placing the lens in radial compression and forming a fluid tight seal between the housing structure and lens.

To provide the desired action of the packing member in placing the lens in radial compression and forming a fluid tight seal between the housing structure and the lens, it generally is required only that the cross-sectional configuration of the packing member in the uncompressed state be greater than the cross-sectional area of the annular space defined by lens surface 32, annular housing wall 22, shoulder 21, the packing member engaging surface of the face plate and the surfaces of the wedging member received within recess 37 of the packing member. This can be achieved by (a) providing for the cross-sectional area of the wedging member to be greater than the cross-sectional area of recess 37 when the packing member is in the uncompressed state, (b) providing the packing member with a length greater than the longitudinal dimension of enlarged opening section 20, (c) providing the packing member in the uncompressed state with a width greater than the width of the annular space provided between the periphery of the lens and the housing structure, or (d) combinations of such arrangements.

With the unit thus assemblied the assembly is mounted on the vessel wall so that the lens overlies opening 16, the face plate engages a gasket 40 disposed in the vessel wall about the periphery of opening 16, and bolt holes 19 are aligned with the threaded holes in the vessel wall. Bolts 18 are then inserted through bolt holes 19 and threaded into the threaded holes of the vessel wall and tightened to complete the mounting of the assembly.

The unit may be disassemblied essentially by reversing the procedure as described. Whenever the lens, packing member or gaskets 28 and 29 require replacement, bolts 18 are removed to dismount the unit, screws 25 are removed and the lens, packing member and gaskets are free to be removed. The replacement components can then be inserted in the housing structure and secured therein in the manner as previously described, and the unit can be remounted on the container wall with a minimum of delay.

Since the housing structure would be shielded from any possible corrosive affects of the fluid within the vessel, it may be fabricated from any suitable material having sufficient strength characteristics, such as carbon steel. Face plate 12 being constantly exposed to the interior of the fluid vessel should be fabricated of material impervious to the effects of the fluid contained in the vessel. Preferably, the face plate is fabricated of stainless steel or a similar suitable material. Alternatively, the face plate simply may be coated with a material which is impervious to the effects of the fluid contained in the vessel.

The packing member preferably should be fabricated of a packing material impervious to the effects of the fluid within the vessel. In this regard, however, it is to be noted that the lens seating portion of the face plate functions to inhibit the flow of fluid within the vessel into contact with the packing member. However, to more effectively shield the packing member from the fluid in the vessel, a protective liner formed of a suitable impervious material such as TEFLON, can be used. Such a liner would be provided with a cylindrical portion interposed between the packing member and the lens, and an annular flange portion interposed between the packing member and the face plate.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A sight glass assembly comprising a housing structure mountable on a vessel containing a fluid, said housing structure having an opening therethrough, said opening having an enlarged section providing a shoulder, a face plate having an opening registered with the opening in said housing structure, mounted on said housing structure so that a portion thereof is disposed in opposed relation to said shoulder, a lens disposed in the enlarged section of the opening in said housing structure and interposed between said shoulder and said portion of said face plate, a packing member disposed in the enlarged section of said opening between said housing structure and a periphery of said lens, an outer end of said packing member having an annular recess extending toward said face plate, an annular wedging member disposed on said shoulder and projecting into the recess of said packing member, said wedging member having a cross-sectional area greater than the cross-sectional area of the recess of said packing member in an uncompressed condition, and means for securing said face plate to said housing structure, said securing means applying a force on said packing member causing said packing member to engage said wedging member and expand it laterally to provide a compressive force about the periphery of said lens and effect a seal between said housing structure and the periphery of said lens.

2. A sight glass assembly according to claim 1 wherein said wedging member projects into the recess of said packing member the major portion of its length.

3. A sight glass assembly according to claim 1 including a first gasket interposed between said lens and said housing structure and a second gasket interposed between said lens and said face plate.

4. A sight glass assembly according to claim 1 including means for securing said housing structure to a wall of said vessel containing a fluid, with the lens overlying an opening therein.

5. A sight glass assembly according to claim 1 wherein said wedging member is seated in an annular recess formed in said shoulder.

6. A sight glass assembly according to claim 1 wherein said wedging member is formed integral with said housing structure.

7. A sight glass assembly according to claim 1 wherein said packing member is formed of a compressible material and is provided with a substantially U-shaped cross-sectional configuration.

8. A sight glass assembly according to claim 1 including a liner disposed between said packing member and said lens and also between said packing member and said face plate, formed of a material impervious to the effects of the fluid contained within said vessel.

9. A sight glass assembly according to claim 1 wherein said face plate member is formed of a material which is impervious to the effects of the fluid contained within said vessel.

10. A sight glass assembly according to claim 1 including a first gasket interposed between said lens and said housing structure and the second gasket interposed between said lens and said face plate, said packing member is formed of a compressible material and is provided with a substantially U-shaped cross-sectional configuration, including a liner formed of a material impervious to the effects of said fluid contained in said vessel, and wherein said face plate is formed of a material impervious to the effects of said fluid.

* * * * *